United States Patent [19]

Lee

[11] Patent Number: 5,791,577
[45] Date of Patent: Aug. 11, 1998

[54] REEL LOCK RELEASING APPARATUS FOR A MAGNETIC RECORDING/REPRODUCING APPARATUS CAPABLE OF OPERATING DUAL SIZED CASSETTES

[75] Inventor: Chang-Ho Lee, Incheon, Rep. of Korea

[73] Assignee: Daewoo Electronics Co., Ltd., Seoul, Rep. of Korea

[21] Appl. No.: 700,827

[22] Filed: Aug. 21, 1996

[30] Foreign Application Priority Data

Aug. 21, 1995 [KR] Rep. of Korea ............... 95-25626

[51] Int. Cl.[6] ................................................. G11B 23/04
[52] U.S. Cl. ................. 242/336; 242/338.1; 242/338.3
[58] Field of Search ........................ 242/336, 338.1, 242/338.3; 360/94

[56] References Cited

U.S. PATENT DOCUMENTS

| 2,206,032 | 7/1940 | Foster ................... 242/338.1 X |
| 3,243,134 | 3/1966 | Reed et al. ............ 242/336 X |
| 3,744,889 | 7/1973 | Wilsch et al. ......... 242/336 X |
| 4,136,843 | 1/1979 | Gourley ................. 242/338.3 |
| 4,470,560 | 9/1984 | Yoneya et al. ........ 242/336 |
| 4,964,001 | 10/1990 | Hirayama et al. ... 360/94 |
| 4,972,278 | 11/1990 | Hara et al. ............ 360/94 |
| 5,316,236 | 5/1994 | Hasegawa et al. ... 242/336 |

Primary Examiner—Daniel P. Stodola
Assistant Examiner—Gregory J. Strimbu

[57] ABSTRACT

A novel tape cassette reel lock releasing apparatus for a magnetic recording/reproducing apparatus. The tape cassette reel lock releasing apparatus includes a main base having a releasing boss inserting hole for a standard type cassette tape which corresponds to the position of a through hole formed on the standard type cassette tape and a releasing boss inserting hole for a small type cassette tape which corresponds to the position of a through hole formed on the small type cassette tape. The tape cassette reel lock releasing apparatus also comprises a releasing boss for the standard type cassette tape and a releasing boss for the small type cassette tape. The releasing bosses are respectively inserted into the releasing boss inserting holes from a lower portion of the main base. A supporting rib is attached to the bottom portion of the main base and is provided between the releasing boss inserting holes. A bracket is hinged to the lower end portion of the supporting rib. The bracket moves in a seesaw motion up and down by an external force and supports the lower portions of the releasing bosses. An elastic means extends from the upper portion of the bracket to the lower portion of the main base to raise the releasing boss for the small type cassette tape. Since the constitution of the tape cassette reel lock releasing apparatus is simple, the manufacture thereof is advantageous and an erroneous operation rarely occurs.

11 Claims, 6 Drawing Sheets

REEL LOCK RELEASING APPARATUS FOR A MAGNETIC RECORDING/REPRODUCING APPARATUS CAPABLE OF OPERATING DUAL SIZED CASSETTES

BACKGROUND OF THE INVENTION

1. Field of the Invention

The present invention relates to a reel lock releasing apparatus for a magnetic recording/reproducing apparatus, and more particularly to a reel lock releasing apparatus for a magnetic recording/reproducing apparatus which can record onto or reproduce from two cassette tapes having different sizes using a single head drum apparatus and can advantageously and selectively release the reel lock of the cassette tapes loaded on a supply reel table and a take-up reel table on a main base.

2. Description of the Prior Art

Generally, a magnetic recording/reproducing apparatus is a device for recording an image and/or an audio signal onto a magnetic tape running along a running system or for reproducing recorded signals. The magnetic tape is wound on a pair of reels provided in a cassette, and when the cassette is loaded into a deck of a tape recorder according to a loading mechanism, the pair of reels are respectively mounted on a supply reel table and a take-up reel table installed on the deck. After completion of installation, tape drawing members draw the tape from the cassette positioned at a loading place so that the tape makes contact with about a half of the circumference of the head drum. After that, a selected running operation such as playing, recording, fast forwarding and rewinding is carried out. At this time, the magnetic tape is drawn out from a reel and wound around the other reel according to the rotational direction of the supply reel table and the take-up reel table.

FIG. 1 is a partially exploded perspective view for showing the internal reel lock apparatus of a cassette tape applied in a magnetic recording/reproducing apparatus.

As shown in FIG. 1, a cassette tape 10 mainly includes a hexahedral upper case 11, a hexahedral lower case 12 and supply reel 13a and a take-up reel 13b which are rotatably formed in a space formed by upper case 11 and lower case 12 at a predetermined distance apart from each other. On tape supply reel 13a and take-up reel 13b, a certain amount of tape is taken-up. In the inner portion of lower case 12 and between tape supply reel 13a and take-up reel 13b, a pair of reel locking levers 14a and 14b are facing each other and are hinged to the inner portion of lower case 12 so that they can move left and right. Reel locking levers 14a and 14b are elastically installed by spring members 15a and 15b which force pull the reel locking levers outward. A through hole 16 is formed on lower case 12 between reel locking levers 14a and 14b, and a releasing lever 17 is formed on top of through hole 16 and between reel locking levers 14a and 14b. Releasing lever 17 moves by an external force applied through through hole 16 so that reel locking levers 14a and 14b move toward their center and release tape supply reel 13a and take-up reel 13b from the lock state. When the external force is eliminated, releasing lever 17 moves so that reel locking levers 14a and 14b move outward and lock tape supply reel 13a and take-up reel 13b.

A research for developing a magnetic recording/reproducing apparatus for recording onto or reproducing from cassette tapes having different sizes, i.e. a standard type and a small type, has been carried out. The standard type cassette tape is mainly used in home video machines and the small type cassette tape is mainly used in portable video cameras. Compatible magnetic recording/reproducing apparatuses are disclosed in U.S. Pat. Nos. 5,316,236 (issued to Hasegawa et al.), 4,964,001 (issued to Hirayama et al.), 4,972,278 (issued to Hara et al.), etc. Since the above mentioned cassette tapes have different sizes, the position of the tape reels after loading are different and accordingly, the position of the reel lock apparatus installed in each cassette tape are different. Therefore, a reel lock releasing apparatus installed in the magnetic recording/reproducing apparatus should be manufactured so that it can release the two cassette tapes having different sizes from their lock status.

FIG. 2 is a schematic planar view of the conventional reel lock releasing apparatus of a magnetic recording/reproducing apparatus using a single head drum apparatus which can record onto or reproduce from two cassette tapes having different sizes.

On a main base 20, a supply reel table 22 and a take-up reel table 24 are installed so that they can move according to the size of a cassette tape, and a head drum 18 is provided at the upper portion. Supply reel table 22 and take-up reel table 24 are selectively moved by the driving force of a capstan motor. When a standard type cassette tape 10a or a small type cassette tape 10b is inserted into a cassette tape holder and is loaded, supply reel table 22 and take-up reel table 24 combine with tape supply reel and take-up reel in cassette tapes 10a and 10b to move the supply reel and take-up reel in a desired direction.

A reel lock releasing apparatus 26 for releasing the tape reels of the loaded cassette tapes 10a and 10b on supply reel table 22 and take-up reel table 24 from the lock state, is provided between supply reel table 22 and take-up reel table 24. Reel lock releasing apparatus 26 is installed to move in connection with the motion of supply reel table 22 and take-up reel table 24 according to the size of the cassette tape.

Reel lock releasing apparatus 26 includes a rotating plate 32 having two releasing bosses 28a and 28b protrusively formed thereon to predetermined heights at a predetermined distance apart from each other and having a gear portion 30 formed within a predetermined angle range at the outer periphery of one end of rotating plate 32, a driving motor 34 driven by a signal application, a cam gear 38 rotated by the driving force of driving motor 34 and having a cam groove 36 formed thereon, an operating arm 42 having an operating gear portion 40 of a circular arc shape, which is meshed with gear portion 30 formed at the end portion of rotating plate 32, and a link 44 which has one end inserted into cam groove 36 to combine with cam groove 36 on cam gear 38 and has the other end inserted into operating arm 42 to combine with a groove formed at one end of operating arm 42.

Reel lock releasing apparatus 26 having the above mentioned constitution operates as follows. At an initial state, supply reel table 22 and take-up reel table 24 are positioned where standard type cassette tape 10a is loaded, and releasing boss 28a formed within the gear portion on rotating plate 32 is located in order to release the tape reels of standard type cassette tape 10a the lock state. Accordingly, the other releasing boss 28b is off set from the position where the standard type cassette tape is located. When standard type cassette tape 10a is loaded, the reel lock of the tape is released by releasing boss 28a, and the tape supply reel and take-up reel combine with the supply reel table and the take-up reel table.

When small type cassette tape 10b is inserted into a cassette holder and is about to be loaded on main base 20, a conventional detecting apparatus of the size of the cassette detects the size of the tape and sends a signal to a microcomputer. The microcomputer applies the signal to driving motor 34 again to drive driving motor 34 in a predetermined direction. After that, cam gear 38 rotates in to a predetermined direction and supply reel table 22 and take-up reel table 24 which are connected to driving motor 34 through various intermediate gears (not shown) move to the front side to fit the reels of small type cassette tape 10b. At the same time, link 44 and operating arm 42 start to operate sequentially. Finally, rotating plate 32 rotates to the front side with gear portion 30 as a center so that releasing boss 28b protrusively formed on the end portion of the rotating plate releases the reel lock state of the small cassette tape.

The motion of the reel lock releasing apparatus of an apparatus using a single head drum and having the above mentioned constitution for recording onto or reproducing from cassette tapes having different sizes, can be accomplished by using a driving motor for transferring the supply reel table and the take-up reel table. However, the structure of this apparatus is very complicated and too many components are needed, so assembling efficiency and productivity is decreased. Moreover, since the releasing operation is accomplished by using the driving motor in connection with the transferring motion of the supply reel table and the take-up reel table, an erroneous operation can occur easily.

SUMMARY OF THE INVENTION

To solve the problems of the conventional art, it is an object of the present invention to provide a novel reel lock releasing apparatus for a magnetic recording/reproducing apparatus, by which the reel locks of a standard type cassette tape and a small type cassette tape can be selectively released and which has a simple constitution, thereby preventing the generation of an erroneous operation thereof.

To accomplish the object of the present invention, there is provided in the present invention a reel lock releasing apparatus for a magnetic recording/reproducing apparatus comprising: a main base having a releasing boss inserting hole for a standard type cassette tape which corresponds to a position of a through hole formed on the standard type cassette tape, and a releasing boss inserting hole for a small type cassette tape which corresponds to a position of a through hole formed on the small type cassette tape; a releasing boss for the standard type cassette tape and a releasing boss for the small type cassette tape, the releasing bosses being respectively inserted into the releasing boss inserting holes from a lower portion of the main base; a supporting rib attached to a bottom portion of the main base and provided between the releasing boss inserting holes; a bracket hinge combined with a lower end portion of the supporting rib, the bracket moving in seesaw motion up and down by an external force and supporting lower portions of the releasing bosses; and an elastic means formed from an upper portion of the bracket to a lower portion of the main base to raise the releasing boss for the small type cassette tape.

Particularly, the lower portions of the releasing bosses can be broader than the main pillar portions of the releasing bosses and are positioned on both end portions of the brackets. More preferably, the lower portions of the releasing bosses can be formed in semi-spherical shapes and corresponding semi-spherical grooves can be formed at both end portions of the bracket for receiving the releasing bosses.

The elastic means can be a spring whose elastic force acts centrally. The spring extends from a predetermined portion of the bracket to a lower portion of the main base. The predetermined portion is between the supporting rib and the releasing boss for the small type cassette tape.

In a different way, the elastic means can be a spring whose elastic force acts outwardly. The spring is formed between a predetermined portion of the bracket and a lower portion of the main base. This predetermined portion is between the supporting rib and the releasing boss for the standard type cassette tape.

The reel lock releasing apparatus according to the present invention is installed at a predetermined position on a main base for generating a seesaw operation between a pair of releasing bosses to selectively act on the loaded cassette tapes on a supply reel table and a take-up reel table on the main base and to release the locking state of the cassette tapes. The manufacture of the apparatus is simple and assembling efficiency and productivity are increased, while an erroneous operation of the apparatus rarely occurs.

BRIEF DESCRIPTION OF THE DRAWINGS

The above object and advantages of the present invention will become more apparent by describing in detail preferred embodiments thereof with reference to the attached drawings, in which.

DESCRIPTION OF THE PREFERRED EMBODIMENT

Hereinafter, the constituting elements and the operation principle of the reel lock releasing apparatus according to the preferred embodiments of the present invention will be explained in more detail with reference to the accompanying drawings.

Figure 3:
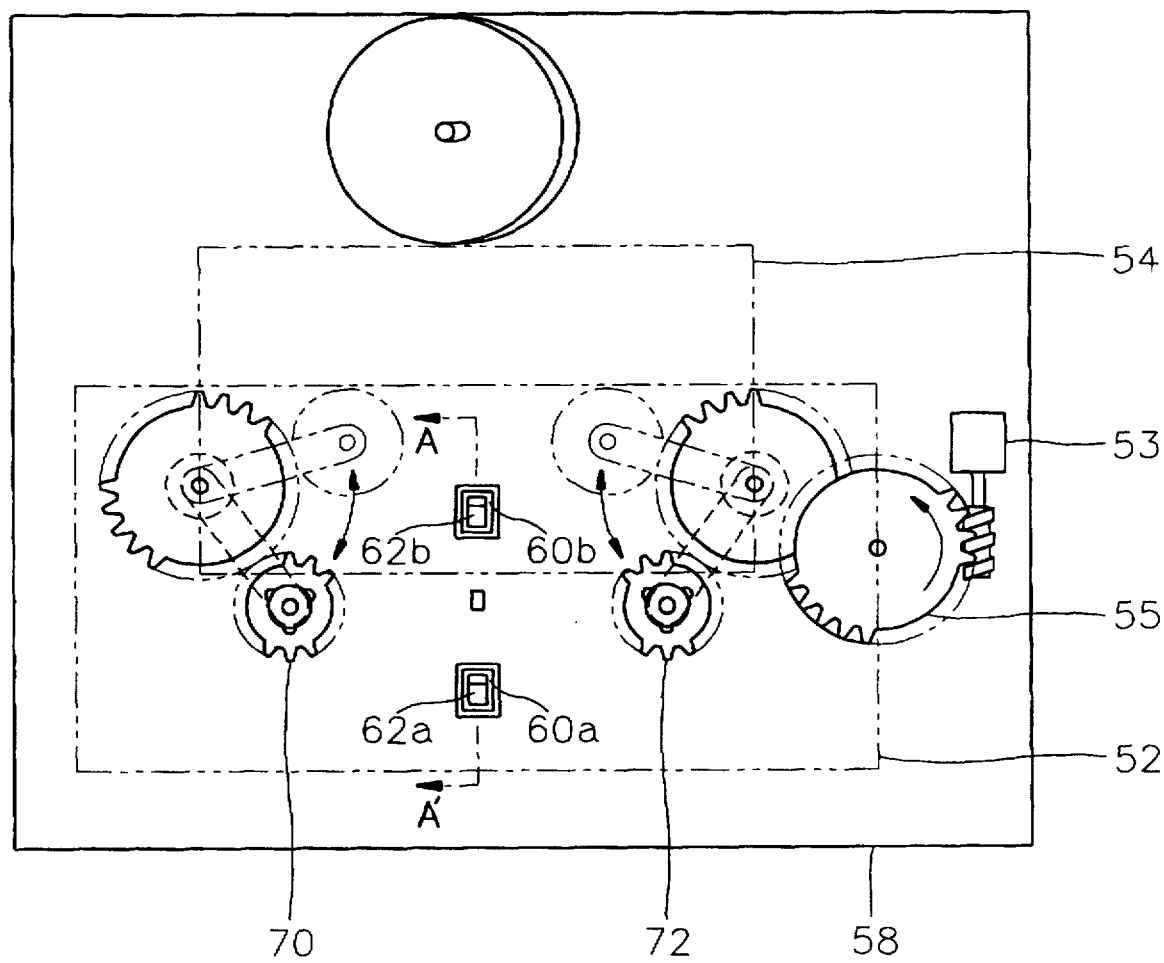
FIG. 3 is a planar view of a reel lock releasing apparatus of a cassette tape having different sizes according to the present invention, when viewed from the upper portion of a main base.

FIG. 3 is a planar view of a reel lock releasing apparatus of a cassette tape having different sizes according to the present invention when viewed from the upper portion of a main base.

Figure 2:
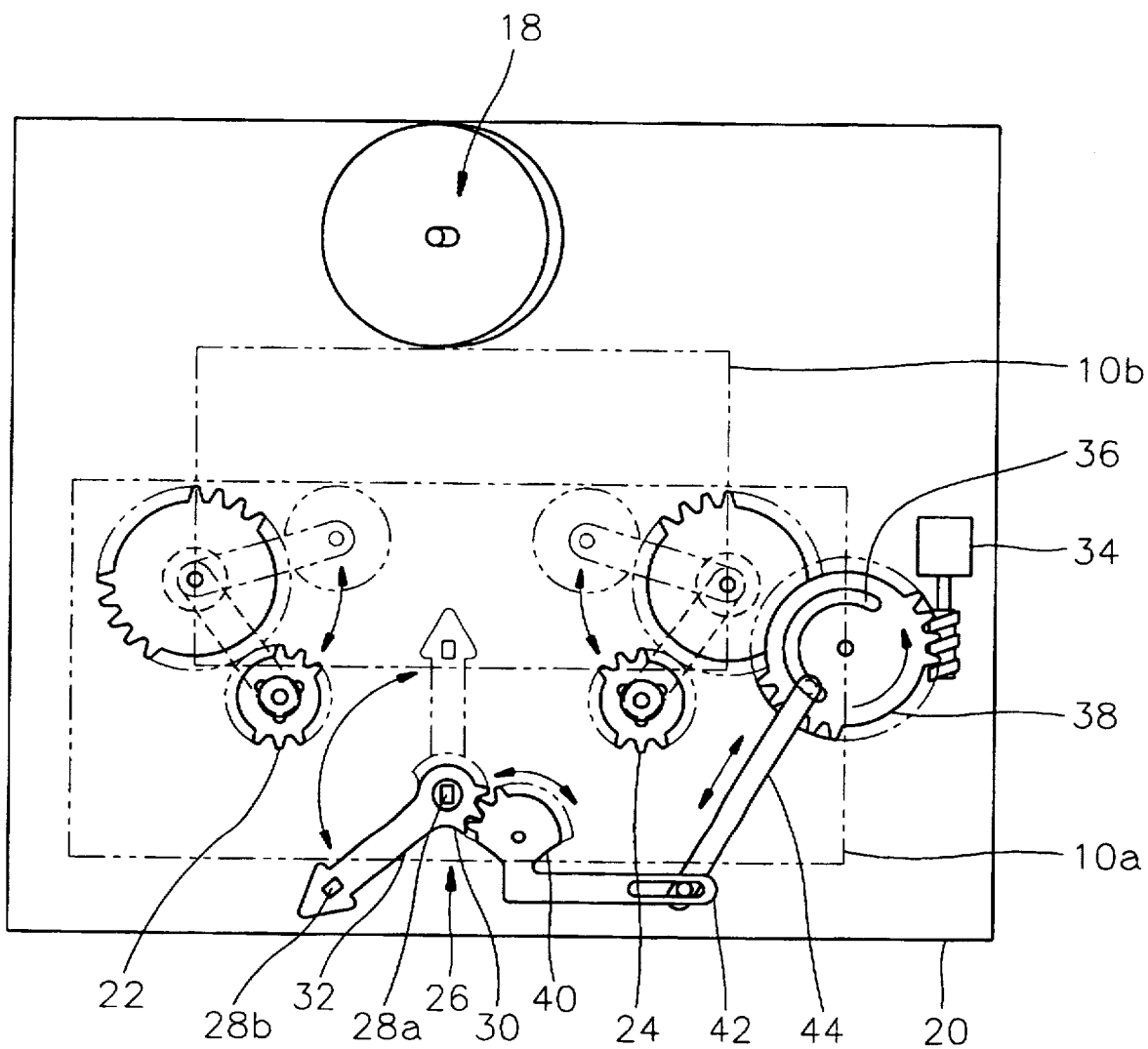
FIG. 2 is a schematic planar view of the conventional reel lock releasing apparatus of a magnetic recording/reproducing apparatus using a single head drum apparatus which can record onto or reproduce from two cassette tapes having different sizes.

A driving motor 53 driven by the application of a signal and provided on a main base 58 and a cam gear 55 which rotates by receiving the driving force of driving motor 53. On the upper portion of main base 58, a pair of releasing boss inserting holes 60a and 60b are formed between supply reel table 70 and take-up reel table 72. In releasing boss inserting holes 60a and 60b, a pair of releasing bosses 62a and 62b are protrusively formed. However, the last four elements make no connection with driving motor 53 or cam gear 55, in contrast to the apparatus in FIG. 2.

Figure 4:
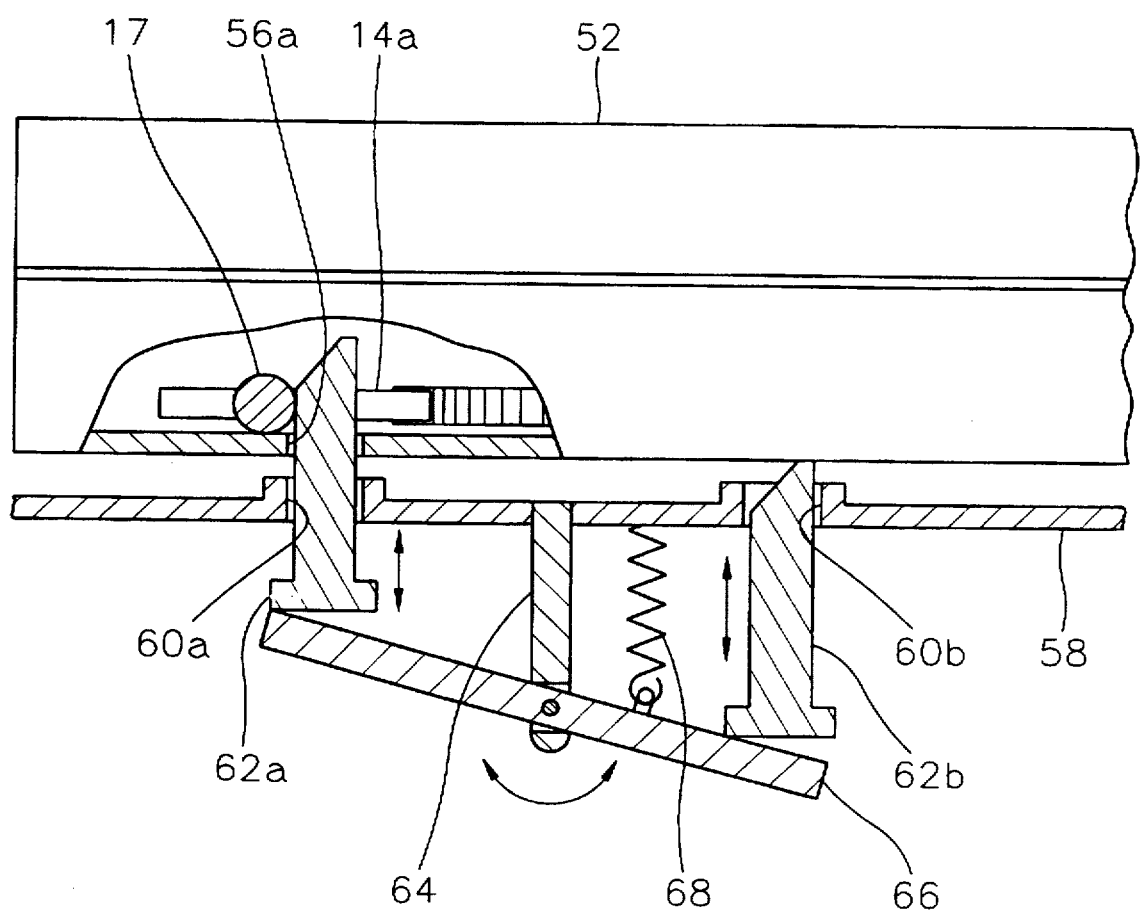
FIG. 4 is a cross-sectional view along the line A-A' in FIG. 3 of the reel lock releasing apparatus according to an embodiment of the present invention when a standard type cassette tape is loaded thereon.
Figure 5:
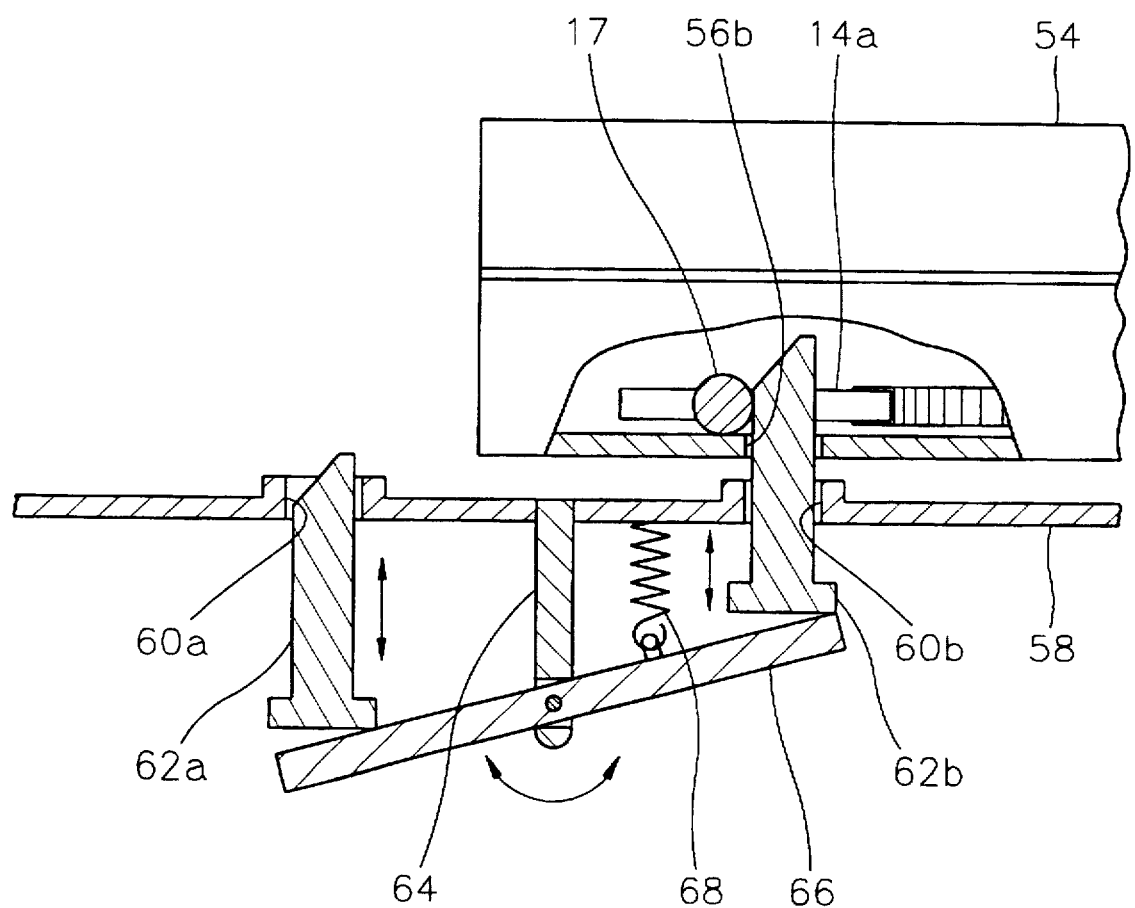
FIG. 5 is a cross-sectional view along the line A-A' in FIG. 3 of the reel lock releasing apparatus according to an embodiment of the present invention when a small type cassette tape is loaded thereon.

FIG. 4 is a cross-sectional view along the line A-A' in FIG. 3 of the reel lock releasing apparatus according to an embodiment of the present invention when a standard type cassette tape is loaded thereon, and FIG. 5 is a cross-sectional view along the line A-A' in FIG. 3 of the reel lock releasing apparatus according to an embodiment of the present invention when a small type cassette tape is loaded thereon.

The reel lock releasing apparatus according to the present invention includes a pair of releasing boss inserting holes 60a and 60b correspondingly formed on main base 58 to each through hole 56a and 56b formed on standard type cassette tape 52 and small type cassette tape 54, a pair of releasing bosses 62a and 62b which are respectively inserted into each releasing boss inserting hole 60a and 60b, a supporting rib 64 protrusively formed from the bottom portion of main base 58 at the center portion of releasing boss inserting holes 60a and 60b, a bracket 66 hinge combined at one end of supporting rib 64 for supporting the bottom portion of releasing bosses 62a and 62b and moving in a seesaw motion by an external force, and a spring 68 installed so that it extends from a front portion of bracket 66 to the bottom of main base 58 to always lift the front portion of bracket 66.

At this time, the diameters of releasing boss inserting holes 60a and 60b are formed somewhat larger than the outer diameters of releasing bosses 62a and 62b considering the moving angle of bracket 66 hinge formed at one end of supporting rib 64.

In this drawing, supporting rib 64 is fixedly inserted into a hole formed on main base 58. Of course, supporting rib 64 can be installed by any method so that it is supported by main base 58, including direct attaching to main base 58.

When the cassette tape is not inserted, releasing boss 62b corresponding to through hole 56b formed on small type cassette tape 54 of the reel lock releasing apparatus having the above described constitution, protrudes above main base 58 for operation because the front portion of bracket 66 is always lifted by the elastic operation of spring 68 toward the center thereof. Meanwhile, releasing boss 62a corresponding to through hole 56a formed on standard type cassette tape 52 is lowered under main base 58 because the other side of bracket 66 is lowered downward.

If standard type cassette tape 52 is loaded and supply reel table 70 and take-up reel table 72 are combined with tape supply reel and take-up reel of the cassette tape, then the front releasing boss 62b which protrudes above main base 58 is lowered downward under main base 58 by the bottom portion of standard cassette tape 52, as shown in FIG. 4. Accordingly, the front end portion of bracket 66 under releasing boss 62b is lowered while the other end of bracket 66 is raised and the rear releasing boss 62a now protrudes above main base 58 through releasing boss inserting hole 60a. Releasing boss 62a is inserted into through hole 56a formed on the bottom portion of standard type cassette tape 52 and pushes releasing lever 17 to move the pair of reel locking levers 14a and 14b toward their center, which releases the tape supply reel and take-up reel from the lock state.

Once standard type cassette tape 52 is removed, the front releasing boss 62b is moved to protrude above main base 58 and the rear releasing boss 62a is moved to be lowered under main base 58 by the elasticity of spring 68. As shown in FIG. 3, if small type cassette tape 54 is inserted at this state, this tape is detected by a separate detecting apparatus and a signal thereof is sent to a microcomputer. The microcomputer operates driving motor 53 so that cam gears (not shown) connected to driving motor 53 are driven. Accordingly, supply reel table 70 and take-up reel table 72, which are coupled to cam gears are transferred to the position where small type cassette tape is loaded. As shown in FIG. 5, at this time, the front protruding releasing boss 62b is inserted into through hole 56b formed on the tape and pushes releasing lever 17 in the tape to move reel locking levers 14a and 14b toward center and release the tape supply reel and take-up reel from the lock state.

The force of spring 68 operates toward the center thereof in FIGS. 4 and 5. Spring 68 is installed between the bottom portion of main base 58 and the front portion of bracket 66 and plays the role of pushing the front releasing boss 62b upward. Accordingly, any releasing apparatus which can push the front releasing boss 62b upward when a cassette tape is not inserted, can be employed instead of spring 68.

Figure 6:
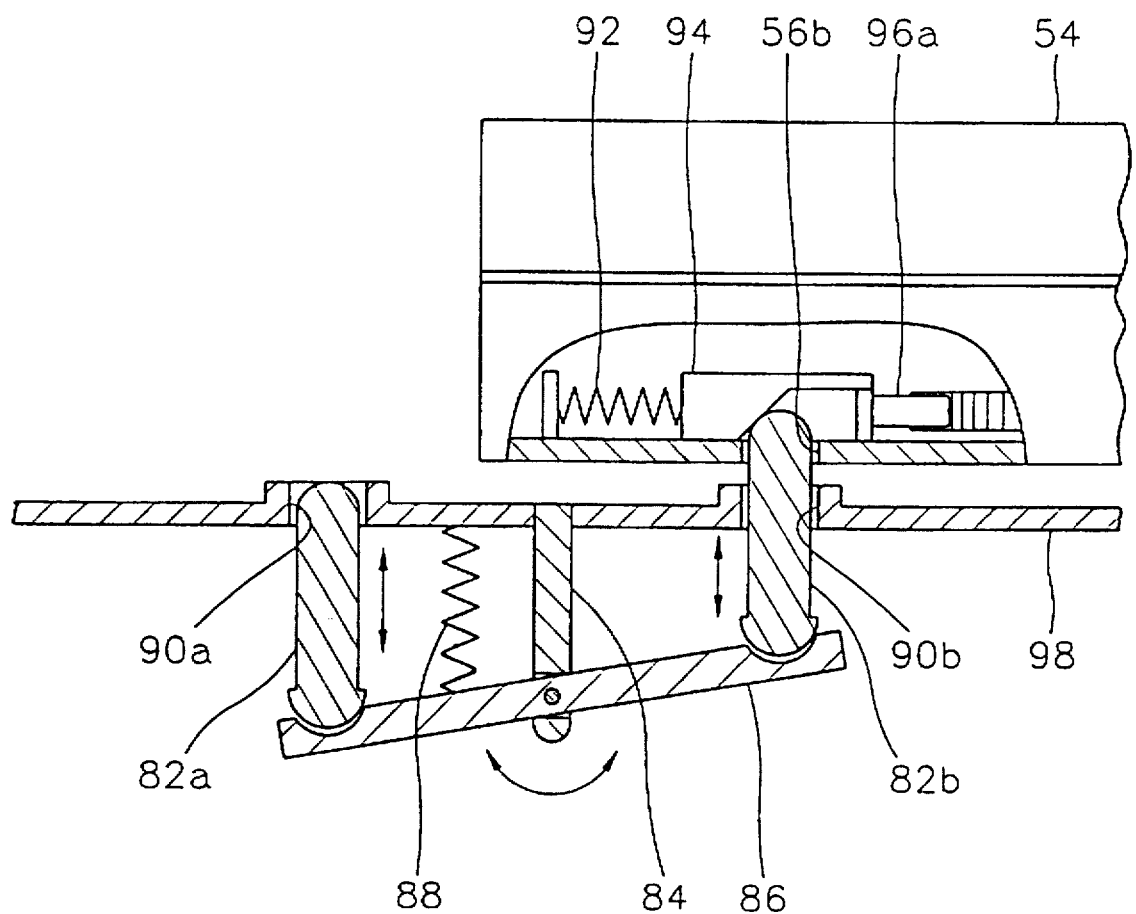
FIG. 6 is a cross-sectional view along the line A-A' in FIG. 3 of the reel lock releasing apparatus according to another embodiment of the present invention when a small type cassette tape is loaded thereon.

FIG. 6 is a cross-sectional view along the line A-A' in FIG. 3 of the reel lock releasing apparatus according to another embodiment of the present invention when a small type cassette tape is loaded thereon.

As in FIG. 5, the reel lock releasing apparatus in FIG. 6 includes a pair of releasing boss inserting holes 90a and 90b formed on a main base 98 and corresponding to through holes 56a and 56b respectively formed on standard type cassette tape 52 and small type cassette tape 54, a pair of releasing bosses 82a and 82b which are respectively inserted into releasing boss inserting holes 90a and 90b, a supporting rib 84 protruding from the bottom portion of main base 98 between releasing bosses 82a and 82b, a bracket 86 hinge formed at one end of supporting rib 84, moving in a seesaw motion by an external force, and for supporting the bottom portions of releasing bosses 82a and 82b, and a spring 88 installed between the rear portion of bracket 86 and the bottom portion of main base 98 so that the front portion of bracket 86 is always lifted. In this embodiment, the upper and lower portions of releasing bosses 82a and 82b are formed in semi-spherical shapes and further, the lower portions protrude somewhat in order to improve the stability of the releasing bosses. In addition, corresponding semi-spherical grooves are formed at the receiving portion of releasing bosses 82a and 82b on bracket 86. The shapes of the releasing boss and the bracket can be advantageously changed as the occasion makes necessary.

Figure 1:
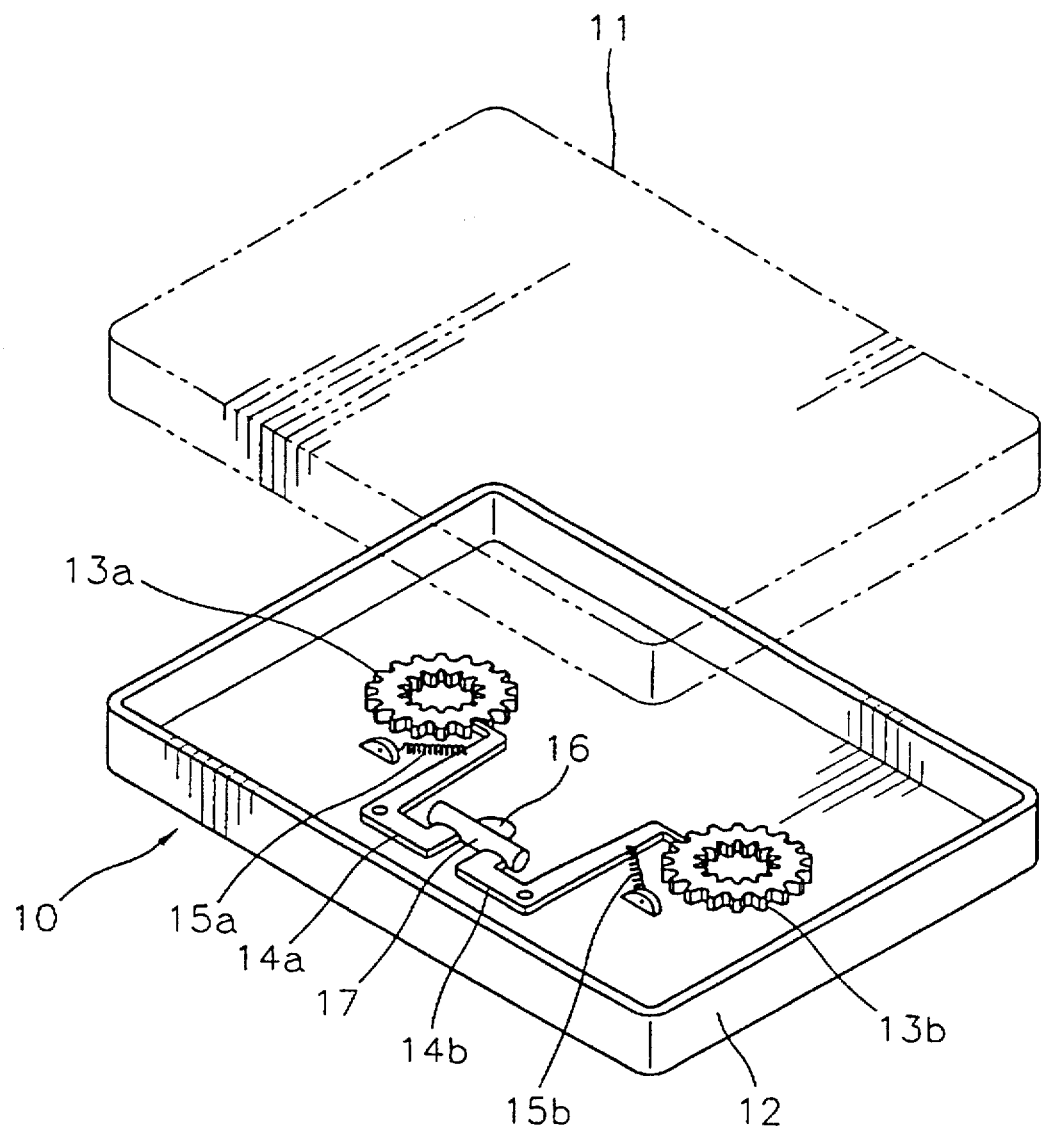
FIG. 1 is a partially exploded perspective view for showing the internal reel lock apparatus of a cassette tape used in a magnetic recording/reproducing apparatus.

A reel locking apparatus for a cassette tape can be manufactured as in FIG. 6, in contrast to the apparatus shown in FIG. 1. A releasing lever 94 is installed. Then a spring member 92 whose elastic force acts forward is formed at the near center portion of releasing lever 94, and a pair of reel locking levers 96a, as shown in FIG. 1 are formed at the end portions of releasing lever 94 (the other reel locking lever is not shown).

If small type cassette tape 54 is loaded onto the reel lock releasing apparatus according to the present invention as shown in FIG. 6, releasing boss 82b, which protrudes above main base 98 due to spring 88 having elastic force acting outward, is inserted into through hole 56b formed at the bottom portion of the tape and pushes releasing lever 94. Then, spring member 92 is pushed backward by releasing lever 94 to move the reel locking levers combined at both ends of releasing lever 94 toward their center, to release the tape supply reel and take-up reel from the lock state.

The reel lock releasing apparatus according to the present invention as described above utilizes an elastic force of the spring and a seesaw motion of the pair of the releasing bosses. The constitution of the apparatus is simple, and the apparatus can be efficiently assembled, so productivity is increased. Moreover, an erroneous operation rarely occurs during operation.

Although the preferred embodiments of the invention have been described, it is understood that the present invention should not be limited to these preferred embodiments, but various changes and modifications can be made by one skilled in the art within the spirit and scope of the invention as hereinafter claimed.

What is claimed is:

1. A reel lock releasing apparatus for a magnetic recording/reproducing apparatus, the magnetic recording/reproducing apparatus having a main base formed with a first releasing boss inserting hole adapted to be positioned in correspondence to a position of a first through hole formed on a standard type cassette tape, and a second releasing boss inserting hole adapted to be positioned in correspondence to a position of a second through hole formed on a small type cassette tape having a size smaller than a size of the standard type cassette tape, the reel lock releasing apparatus comprising:

a first releasing boss for said standard type cassette tape and a second releasing boss for said small type cassette tape, said first and second releasing bosses adapted to be respectively inserted into said first and second releasing boss inserting holes from a lower portion of said main base;

a supporting rib for attachment to a bottom portion of said main base between said first and second releasing boss inserting holes;

a bracket hinged to a lower end portion of said supporting rib, said bracket moving in a seesaw manner about said supporting rib by an external force, said bracket supporting lower portions of said first and second releasing bosses; and an elastic means extending from an upper portion of said bracket toward the lower portion of said main base to raise said second releasing boss for said small type cassette tape.

2. A reel lock releasing apparatus for a magnetic recording/reproducing apparatus as claimed in claim 1, wherein the lower portions of said first and second releasing bosses are broader than main pillar portions of said first and second releasing bosses and each is positioned on a respective end portion of said bracket.

3. A reel lock releasing apparatus for a magnetic recording/reproducing apparatus as claimed in claim 2, wherein said elastic means is a spring, said spring extending from a predetermined portion of said bracket toward the lower portion of said main base, said predetermined portion being between said supporting rib and said second releasing boss for said small type cassette tape.

4. A reel lock releasing apparatus for a magnetic recording/reproducing apparatus as claimed in claim 2, wherein said elastic means is a compression spring, said compression spring extending from a predetermined portion of said bracket toward the lower portion of said main base, said predetermined portion being between said supporting rib and said first releasing boss for said standard type cassette tape.

5. A reel lock releasing apparatus for a magnetic recording/reproducing apparatus as claimed in claim 2, wherein diameters of said first and second releasing boss inserting holes are larger than outer diameters of said first and second releasing bosses.

6. A reel lock releasing apparatus for a magnetic recording/reproducing apparatus as claimed in claim 2, wherein said supporting rib is adapted to be combined with said main base by being inserted into a hole formed on said main base.

7. A reel lock releasing apparatus for a magnetic recording/reproducing apparatus, the magnetic recording/reproducing apparatus having a main base formed with a first releasing boss inserting hole adapted to be positioned in correspondence to a position of a first through hole formed on a standard type cassette tape, and a second releasing boss inserting hole adapted to be positioned in correspondence to a position of a second through hole formed on a small type cassette tape having a size smaller than a size of the standard type cassette tape, the reel lock releasing apparatus comprising:

a first releasing boss for said standard type cassette tape and a second releasing boss for said small type cassette tape, said first and second releasing bosses adapted to be respectively inserted into said first and second releasing boss inserting holes from a lower portion of said main base, and lower portions of said first and second releasing bosses being formed in semi-spherical shapes;

a supporting rib for attachment to a bottom portion of said main base between said first and second releasing boss inserting holes;

a bracket hinged to a lower end portion of said supporting rib, said bracket moving in a seesaw manner about said supporting rib by an external force, said bracket supporting the lower portions of said first and second releasing bosses, semi-spherical grooves being formed at both end portions of said bracket for receiving said first and second releasing bosses; and an elastic means extending from an upper portion of said bracket toward the lower portion of said main base to raise said second releasing boss for said small type cassette tape.

8. A reel lock releasing apparatus for a magnetic recording/reproducing apparatus as claimed in claim 7, wherein said elastic means is a spring, said spring extending from a predetermined portion of said bracket toward the lower portion of said main base, said predetermined portion being between said supporting rib and said second releasing boss for said small type cassette tape.

9. A reel lock releasing apparatus for a magnetic recording/reproducing apparatus as claimed in claim 7, wherein said elastic means is a compression spring, said compression spring extending from a predetermined portion of said bracket toward the lower portion of said main base, said predetermined portion being between said supporting rib and said first releasing boss for said standard type cassette tape.

10. A reel lock releasing apparatus for a magnetic recording/reproducing apparatus as claimed in claim 7, wherein diameters of said first and second releasing boss inserting holes are larger than outer diameters of said first and second releasing bosses.

11. A reel lock releasing apparatus for a magnetic recording/reproducing apparatus as claimed in claim 7, wherein said supporting rib is adapted to be combined with said main base by being inserted into a hole formed on said main base.

* * * * *